United States Patent [19]

Tominaga

[11] 4,400,751
[45] Aug. 23, 1983

[54] VIDEO HEAD DRUM FOR VIDEO TAPE RECORDERS

[75] Inventor: Tamotsu Tominaga, Akishima, Japan

[73] Assignee: Hitachi Denshi Kabushiki Kaisha, Tokyo, Japan

[21] Appl. No.: 239,207

[22] Filed: Mar. 3, 1981

[30] Foreign Application Priority Data

Mar. 6, 1980 [JP]  Japan ................................. 55-28199

[51] Int. Cl.³ .......................... G11B 5/52; F16C 7/04; G11B 15/60; G11B 21/18
[52] U.S. Cl. ....................................... 360/107; 360/84; 360/108; 360/130.24; 384/261
[58] Field of Search .................... 308/9; 360/107, 108, 360/109, 84, 130.24

[56] References Cited

U.S. PATENT DOCUMENTS 4,031,558  6/1977  Kusaka ................................. 360/108
4,099,212  7/1978  Dolby ................................... 360/109
4,197,565  4/1980  Watanabe .............................. 360/84

Primary Examiner—Robert M. Kilgore
Attorney, Agent, or Firm—Oblon, Fisher, Spivak, McClelland & Maier

[57] ABSTRACT

A video head drum for a helical scan type video tape recorder, in which a rotary head drum is fixed to a rotary shaft by use of a ring member placed over a cylindrical member which is fitted into the central portion of the rotary head drum and substantially fixed thereto and in which the rotary shaft is inserted, and a pair of ring-shaped fastening plates. The cross section of the ring member in the rotating axial direction indicates an outward bulge at the center and the ring-shaped fastening plates are disposed so as to sandwich the bulge. By fastening the ring-shaped plates, the ring member is forced to be compressed in the radius direction thereof, fixing tightly the cylindrical member to the rotary shaft and consequently fixing the rotary head drum to the rotary shaft, whereby correct attachment of the rotary head drum to the rotary shaft, without causing any eccentric rotation of the rotary head drum or vibrations thereof, can be attained.

5 Claims, 2 Drawing Figures

VIDEO HEAD DRUM FOR VIDEO TAPE RECORDERS

BACKGROUND OF THE INVENTION

The present invention relates to a video head drum for a video tape recorder.

Currently, video tape recorders of a helical scan type are most popular for business use, for instance in broadcasting stations. With respect to such video tape recorders, high image quality, high operational reliability and simple maintenance are required. Therefore, generally it is required that the vibrations of the rotary shaft of the rotary head drum of the video head drum be less than 5 μm, and that the rotary head drum be replaceable by a new rotary head drum easily and speedily when its magnetic head or drum becomes abraded or damaged. Moreover, it is required that the rotary head drum be always replaceable with consistent accuracy of attachment of the replacement.

For that purpose, a video head drum as shown in FIG. 1 is conventionally known. In the figure, reference numeral 1 represents a lower guide drum; reference numeral 2, a rotary head drum; reference numeral 3, a rotary shaft; reference numeral 4, ball bearings; reference numeral 5, a flange portion of the rotary shaft 3; reference numeral 6, a nut; reference numeral 7, a magnetic head; reference numerals 8a and 8b, a rotary transformer.

The rotary shaft 3 is rotatably supported by a bearing portion 1a including the ball bearings 4, which bearing portion 1a is formed in the lower guide drum 1. The rotary head drum 2 is placed over an upper portion of the flange portion 5 of the rotary shaft 3 and supported by a sleeve 2a formed around a center hole of the rotary head drum 2. The rotary head drum 2 is fixed to the rotary shaft 3 by screwing a nut 6 on to an external thread portion 3a formed on the upper portion of the rotary shaft 3.

The magnetic head 7 is attached to a lower surface of the rotary head drum 2 in such a manner that the magnetic head 7 extends partly outward in the radius direction of the rotary head drum 2 from the gap formed between the lower guide drum 1 and the rotary head drum 2. Inputting signals to and outputting the same from the magnetic head 7 are performed through the rotary transformer 8a and 8b.

In the thus constructed video head drum, the rotary head drum 2 can be detached from the rotary shaft 3 by unscrewing the nut 6, and the rotary head drum 2 and the magnetic head 7 can be replaced speedily without any mechanical difficulty. In that case, if the end surfaces 2b and 2c of the sleeve 2a of the rotary head drum 2, the end surface 5a of the flange portion formed in the rotary shaft 3 and the end surface 6a of the nut 6 are at accurate right angles with respect to the axis of the rotary shaft 3, the rotary head drum 2 and the magnetic head 7 can also be attached with the required accuracy.

However, in view of the manufacturing techniques for those elements, guaranteeing the right-angle alignment of the end surfaces 2b, 2c, 5a and 6a with such accuracy will decrease the rate of production of the products, and will increase the production cost, to the extent that such accurate manufacturing is impractical. Therefore, when manufacturing those products, certain variations with respect to the accuracy of the right-angle alignments have to be allowed for in practice.

It may occur, therefore, that members without such perfect accuracy with respect to the right-angle alignment of the end surfaces 2b, 2c, 5a and 6a are employed. In such a case, in the conventional video head drum as shown in FIG. 1, it may occur that the rotary shaft 3 is misaligned or is bent, as shown with exaggeration in FIG. 1, when the rotary head drum 2 is fixed to the rotary shaft 3 with the nut 6, causing eccentric rotation of the rotary head drum 2 and vibrations of the rotary shaft 3. Once this takes place, the rotary head drum 2 cannot be used any longer in practice. Conventionally, in order to provide a solution to that problem, the clearance between the rotary shaft 3 and the sleeve 2a of the rotary head drum 2, when they are fitted together, is slightly excessive, and, when assembling, the correct alignment of the rotary head drum 2, where vibrations of the rotary shaft 3 can be minimized, is determined by gradually moving the rotary head drum 2 relative to the rotary shaft 3 within the clearance, while simultaneously rotating the rotary head drum 2, and employing a lever-type dial gauge indicator putting against the outer peripheral surface of the rotary head drum 2. When the correct position is found, the rotary head drum 2 is fixed to the rotary shaft 3 by fastening the nut 6.

This alignment adjustment procedure for keeping the shaft vibrations within 5 μm requires some special measurement tools, such as the above-mentioned indicator, and special training for making such adjustment. Therefore, it is difficult for ordinary users of the video tape recorder, even the VTR operators in broadcasting stations, to replace the rotary head drum 2 and the magnetic head 7 by themselves, so that the cost for the maintenance of the video tape recorder is high. These are shortcomings of the conventional video tape recorders.

SUMMARY OF THE INVENTION

It is therefore an object of the present invention to provide a video head drum which does not require high working accuracy of alignment for the attachment of a rotary head drum to a rotary shaft, and in which vibrations of the shaft are minimized, and from which the shortcomings of the conventional video head drum have been eliminated.

According to the present invention, in order to attain the above-mentioned object, the video head drum is designed in such a manner that the force for fixing the rotary head drum to the rotary shaft is applied so as to be directed radically towards the center of the rotary shaft, and the force application means is a member independent of the rotary shaft and of the sleeve of the rotary head drum.

DETAILED DESCRIPTION OF THE PREFERRED EMBODIMENT

Figure 1:
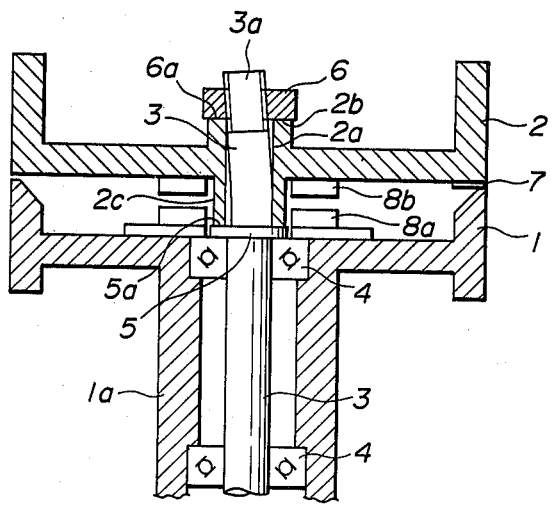
FIG. 1 is a cross sectional view of a conventional video head drum.
Figure 2:
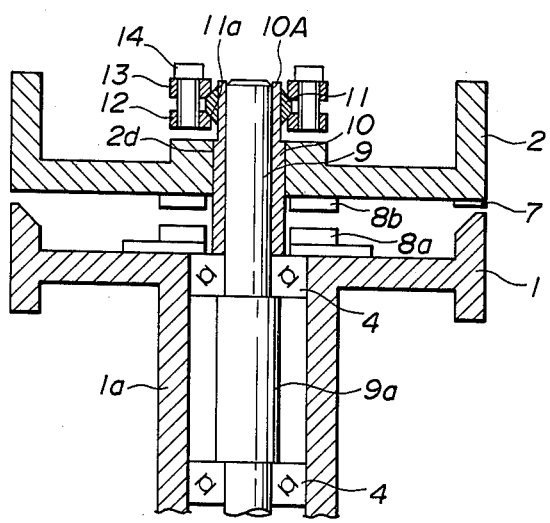
FIG. 2 is a cross sectional view of an embodiment of a video head drum according to the present invention.

Referring to FIG. 2, there is shown a cross sectional view of an embodiment of a video head drum according to the present invention. In the figure, the lower guide drum 1, the rotary head drum 2, the ball bearings 4, the magnetic head 7, the rotary transformer 8a and 8b, and the bearing portion 1a formed on the lower surface of the lower guide drum 1 are the same as those in the conventional video head drum as shown in FIG. 1.

In FIG. 2, reference numeral 9 represents a rotary shaft; reference numeral 10, a sleeve which is a cylindrical member; reference numeral 11, a ring member, which is tubular and cylindrical, and the longitudinal cross section of the wall of which has an outward bulge at the center, as shown in the figure; reference numerals 12 and 13, a pair of ring-shaped plates which sandwich a ring member 11; and reference numeral 14, bolts for fastening the ring-shaped plates 12 and 13.

The rotary shaft 9 includes a large diameter portion 9a. At the opposite ends of the large diameter portion 9a, there are disposed ball bearings 4, whereby the rotary shaft 9 is rotatably supported by the bearing portion 1a.

Into the central hole 2b of the rotary drum 2 is firmly fitted a sleeve 10 which is made of copper phosphate or stainless steel.

In the upper portion of the sleeve 10, a thin wall cylindrical portion 10A is formed, the wall of which is thinner than that of the remainder of the sleeve 10 and the outer diameter of which is smaller than that of the remainder of the sleeve 10. The ring member 11 is placed over the thin wall cylindrical portion 10A. The outside of the ring member 11 is tapered in the directions of both opposite ends of the ring member 11. In other words, the longitudinal cross section of the wall of the ring member 11 has an outward bulge at the center. A pair of ring-shaped plates 12 and 13 are respectively disposed at the lower end portion and the upper end portion of the ring member 11a, in such a manner as to hold the large diameter portion of the ring member 11 between them.

The inner diameter of the pair of ring-shaped plates 12 and 13 is smaller than the outer diameter of the maximum diameter portion in the outer peripheral surface 11a of the ring member 11, and the portions of ring-shaped plates 12 and 13 which are in contact with the ring member 11 are formed in such a shape as to conform to the outer peripheral surface 11a of the ring-shaped member 11 when the ring-shaped plates 12 and 13 are fastened together by a plurality of bolts 14.

Between the inner peripheral surface of the sleeve 10 and the outer peripheral surface of the rotary shaft 9, there is provided such a clearance that attachment of the rotary head drum 2 to the rotary shaft 9 and detachment of the former from the latter can be done without difficulty, but so that the sleeve 10 and the rotary shaft 9 are not loose in rotation, for instance, with a clearance not greater than 10 μm.

The operational advantages of the thus constructed embodiment of a video head drum according to the present invention will now be explained.

When mounting the rotary head drum 2 on the rotary shaft 9, first fit the sleeve 10 of the rotary head drum 3 on the upper end portion of the rotary shaft 9 and bring the sleeve 10 downwards until the lower end of the sleeve 10 comes into contact with the upper ball bearing 4, and the sleeve 10 stops. Loosely fasten the ring member 11 between the ring-shaped plates 12 and 13 by the bolts 14, and mount the ring member 11 on the thin wall cylindrical portion 10A of the sleeve 10. Alternatively, mount the ring member 11 and the ring-shaped plates 12 and 13 on the thin wall cylindrical portion 10A of the sleeve 10 in the above-mentioned sandwiching order and then fasten them loosely by the bolts 14. At their correct position, they are fastened securely by tightening the bolts 14.

Since a plurality of bolts 14 are provided, they are tightened alternately little by little. By that fastening, the pair of ring-shaped plates 12 and 13 are caused to come closer to each other. As a result, the inside portions of the ring-shaped plates 12 and 13 are moved in such a direction as to "climb outward" over the bulge portion in the outer peripheral surface 11a of the ring member 11, applying force to the ring member 11 in the radius direction thereof, so that the ring member 11 is compressed in the radius direction thereof. At the same time, the thin wall cylindrical portion 10A of the sleeve 10 is compressed by the force applied to the outer peripheral surface thereof. Thus, the sleeve 10 is fixed tightly to the rotary shaft 9.

Since the force applied to the ring member 11 by the fastening of the ring-shaped plates 12 and 13 is always of point symmetry with respect to the axis of the rotary shaft 9, even if the fastening force of each of the bolts 14 is not more or less uniform, the compression force on the inner diameter of the thin wall cylindrical portion 10A caused by the ring member 11 is always directed only to the center of the rotary shaft 9. Therefore, by the self-centering function of the ring member 11, the risk of vibrations of the rotary shaft 9 is completely eliminated. Accordingly, the rotary head drum 2 can be always mounted on the rotary shaft 9 with consistent accuracy, without requiring any particular adjustment procedure.

When repairing of the video tape recorder is needed due to abrasion of some part or damage to the magnetic head 7 and the rotary head drum 2 has to be detached from the rotary shaft 9, the bolts 14 are unscrewed, whereby the ring-shaped plates 12 and 13 are moved in such a direction as to be separated from each other along the curve of the bulge in the peripheral surface 11 of the ring member 11, because of the elasticity of the ring member 11. At the same time, the diameter of the thin wall cylindrical portion 10A of the sleeve 10 returns to its original diameter due to the elasticity of the thin wall cylindrical portion 10A, so that the rotary shaft 9 is released from the sleeve 10.

Thus, the rotary head drum 2 can be detached from the rotary shaft 9 with ease and repairs can be effected. As mentioned previously, the rotary head drum 2 can be attached with consistent accuracy.

In the above-mentioned embodiment of a video head drum according to the present invention, the thin wall cylindrical portion 10A of the sleeve 10 and the ring member 11 are separate members. Therefore, there is no limitation on the construction of the sleeve 10, in the sense that the sleeve 10 can be made thicker with greater rigidity sufficient for preventing any twisting or distortion of the rotary head drum 2 when it is mounted on the rotary shaft 9. In contrast, when the sleeve 10 and the ring member 11 are constructed in one piece as is disclosed in Japanese Laid-open Patent Application No. 54-147021/1979, the ring member 12 cannot be fitted in the lower portion of the ring member 11 from the upper end of the sleeve 10. Thus, the ring member 11 has to be placed at the lower portion of the thin wall cylindrical portion 10A before the sleeve 10 is fitted into the center hole of the rotary head drum 2 and fixed to the rotary head drum 2. In this construction, the outer diameter of the sleeve 10 cannot be greater than the inner diameter of the ring-shaped plate 12. Therefore, there is a limitation to the thickness of the wall of the sleeve 10, permitting twisting of the sleeve 10 due to the insufficient rigidity thereof. In contrast, in the video head drum according to the present invention, such twisting of the sleeve can be compltely prevented.

Moreover, according to the present invention, since the sleeve 10 and the ring member 11 are separate members, the thickness of the wall of the thin wall cylindrical portion 10A can be decreased as desired independently of the thickness of the wall of the sleeve 10, with the effect that much force is not required to obtain the fastening effect of the thin wall cylindrical portion 10A directed to the rotary shaft 9 by screwing the bolts 14. Accordingly, excessive strength is not required for the members of the video head drum and, therefore, the total weight of the video head drum can be decreased. As a matter of course, the assembling of the video head drum is simple.

In the above-mentioned embodiment, it is unnecessary to place the ring-shaped plate 12 at the lower portion of the thin wall cylindrical portion 10A beforehand, and, unlike in the above-mentioned prior art, the rotary head drum 2 and the sleeve 10 can be made in the form of a unitary member.

Moreover, depending upon the material selected for making the sleeve 10, the above-mentioned fastening effect can be obtained without forming the thin wall cylindrical portion 10A as a part of the sleeve 10.

The ring member 11 can be segmented into a plurality of portions in the circumferential direction of the ring member 11.

What is claimed is:

1. In a video head drum comprising a lower guide drum, a rotary head drum which is disposed coaxially with said lower guide drum and a rotary shaft which passes through the center of said lower guide drum and that of said rotary head drum and is fixed to said rotary head drum, the improvement comprising a cylindrical member fitted in the opening in the central portion of said rotary head drum, a ring member which is mounted on said cylindrical member, the cross section of said ring member in the rotating axial direction thereof including an outward bulge at the center, and a pair of ring-shaped plates, each having an inner diameter smaller than the maximum outer diameter of said ring member, said ring-shaped plates being fitted along the outer peripheral portion of said ring member in such a manner as to sandwich said bulge, said ring-shaped plates including means for fixing said rotary head drum to said rotary shaft, said means for fixing including means for drawing said ring-shaped plates in a direction which brings said ring-shaped plates closer to each other.

2. A video head drum as claimed in claim 1, wherein said cylindrical member includes a thin wall cylindrical portion which is inserted to lie within said ring member.

3. A video head drum as claimed in claim 1, wherein said cylindrical member and said rotary head drum are made as a unitary member.

4. A video head drum as claimed in claim 1, claim 2 or claim 3, wherein said ring member is segmented into a plurality of portions in the circumferential direction thereof.

5. A video head drum as claimed in claim 1, claim 2, or claim 3, wherein said means for fixing comprise at least three bolts extending between said ring-shaped plates.

* * * * *